(12) United States Patent
Knuthson

(10) Patent No.: US 6,860,290 B2
(45) Date of Patent: Mar. 1, 2005

(54) RAPID COUPLING SYSTEM

(75) Inventor: Per Knuthson, Stenstorp (SE)

(73) Assignee: Tema Marketing AG, Berlin (DE)

( * ) Notice: Subject to any disclaimer, the term of this patent is extended or adjusted under 35 U.S.C. 154(b) by 0 days.

(21) Appl. No.: 10/418,426

(22) Filed: Apr. 17, 2003

(65) Prior Publication Data

US 2003/0201017 A1 Oct. 30, 2003

(30) Foreign Application Priority Data

Apr. 22, 2002 (DE) .......................... 102 17 922

(51) Int. Cl.[7] ............................................... F16L 29/04
(52) U.S. Cl. .................. 137/594; 137/595; 137/614.03; 285/124.1; 285/124.5; 285/924
(58) Field of Search ........................... 285/124.1, 124.5, 285/924; 137/614.03, 614.04, 614.05, 614, 595, 594

(56) References Cited

U.S. PATENT DOCUMENTS 3,730,221 A * 5/1973 Vik ...................... 137/614.04
4,371,004 A * 2/1983 Sysolin et al. ......... 137/614.04
5,464,042 A * 11/1995 Haunhorst .................... 137/595

FOREIGN PATENT DOCUMENTS

DE 422 22 183 C2 7/1991
EP 0 522 493 B1 7/1992

* cited by examiner

Primary Examiner—Kevin Lee
(74) Attorney, Agent, or Firm—Kelly Lowry & Kelley

(57) ABSTRACT

A rapid coupling system for establishing a connection of at least two pressurized lines in a pressure sealed manner is provided. A first coupling plug element has an operating mechanism, including a journal, in a connecting block thereof. A second coupling socket element is adapted to be connected to the first coupling element in a pressure sealed manner. A control unit is arranged in a socket element connecting block and includes a displaceable plunger having at least one cam. A pressure relief unit is connectable to at least one of the pressure lines via a pressure relief connection. When the first and second coupling elements are connected to one another, the journal of the operating mechanism displaces the control plunger, causing at least one cam of the control plunger to engage the pressure relief unit.

17 Claims, 6 Drawing Sheets

RAPID COUPLING SYSTEM

BACKGROUND OF THE INVENTION

The invention relates to a rapid coupling system.

Rapid coupling systems of the generic type are known. They serve for the connection of pressurised, medium-conducting lines and are used in the context of liquids, e.g. hydraulic oils, gasses and other appropriate media. Such rapid coupling systems comprise usually two coupling elements, wherein a first coupling element is a plug element and a second coupling element is a socket element. For coupling the plug element can be plugged into the socket element. The generic rapid coupling system serves also to connect lines which are under high media pressure. To this end the connection must be established either under pressure in the socket element and another time under pressure in the plug element of the coupling system. The connection can also be established under pressure in both coupling elements or in pressureless state of both coupling elements.

In rapid coupling systems designed for high media pressure, e.g. of 20 to 50 MPa in one of the two or in both coupling elements, pressure release valves are known for easier handling when establishing the coupling. With the help of such pressure relief valves it is possible to reduce the pressure in the coupling element by diverting a small amount of the medium to the face of the coupling element. This facilitates the connection of the two coupling elements of the rapid coupling system. The arrangement of pressure relief valves in both coupling elements is also known.

From DE 41 01 001 a coupling apparatus is known wherein a pressure relief valve is arranged in the interior of at least one coupling element which is actuated when connecting the plug element with the socket element. The pressure relief valve comprises a diverting channel for the media pressure and a cut-off element that is arranged in the pressure relief valve and can be actuated by an actuator. Upon actuation of the pressure relief valve the chambers of the coupling elements associated with it form communicating vessels which leads to a pressure compensation and allows to establish the coupling with less expenditure of energy.

A problem that occurs frequently with rapid coupling systems is that the pressure relief valves included in the coupling elements have a complicated structure. In addition to this contamination of the media result in dogged pressure relief valves and stiff rapid coupling systems. Another disadvantage is that depending on the type of rapid coupling system the plug element or the socket element or both coupling elements must be provided with the complicated pressure relief valves.

So the object of the present invention is to provide a rapid coupling system of the generic type which allows a simple way of easy coupling under avoidance of the above mentioned disadvantages in all pressure ranges.

SUMMARY OF THE INVENTION

Easy coupling in all pressure ranges is enabled in that a first coupling element which can be connected with a second coupling element in order to establish a pressure sealed connection between at least two pressurised lines and that an external pressure relief unit is allocated to the rapid coupling system which is connected with at least one of the pressurised lines via at least one pressure relief connection.

The first coupling element to establish the rapid coupling is a plug element and the second coupling element is a socket element. The plug element and a journal are located together in a connecting block pertaining to the plug element. The socket element is arranged together with a control unit in another connecting block pertaining to the plug element. This ensures a very compact and functional establishment of the rapid coupling.

A preferred embodiment of the invention provides that the external control unit engages in the external pressure relief unit. The pressure relief unit is located in a third connecting block. The control unit comprises a displaceable control plunger with at least one cam. The control plunger with the cam engages in a pressure relief valve system which is arranged in the interior of the pressure relief unit. Depending on the position of the plug element in relation to the socket element, the pressure relief valve system can be opened and closed by means of the said cam. This provides a pressure relief unit that is characterised by a high operational reliability.

Preferred according to the invention is further a pressure relief connection between at least one pressurised line and the pressure relief unit wherein each line resp. each coupling pair—plug element and socket element—of the rapid coupling system is allocated a pressure relief connection and a pressure relief valve system. The pressure relief valve system is allocate a pressure chamber and the pressure relief line. When the in-line arranged pressure relief valve system is opened the pressure relief connection towards the pressure chamber and the pressure relief line is released.

A preferably preferred embodiment of the invention further provides for several coupling pairs to be integrated in the rapid coupling system. In this case several lines are connected each with one pressure relief valve system and each through a pressure relief connection. The opening of the pressure relief valve systems depends on the control unit through which the medium streams into the pressure chamber—and from there into the joint pressure relief line. Depending on the prevailing pressure in the pressure relief line and the coupling pair, a pressure relief of the coupling pairs of the rapid coupling system occurs.

In a preferred embodiment of the invention it is possible to synchronise the opening of the pressure relief valve system during coupling by means of the control unit in accordance with the cam located on the control plunger. This way the pressure compensation of several coupling pairs is carried out synchronously through the appropriate pressure relief connections and the joint pressure relief line.

In a further preferred embodiment of the invention, in order to achieve a possibly short but synchronised opening of the respective pressure relief valve system, the control plunger is arranged such that the cam moves into the pressure relief valve system, or comes out of it, exactly in the moment when the respective sealing units in the coupling elements open or close.

In an advantageous embodiment an internal pressure relief valve in the interior of at least one coupling element can be abandoned due to the arrangement of an external pressure relief unit.

In the following further preferred embodiment of the invention are described by means of one coupling pair.

They apply accordingly, however, for embodiments of several coupling pairs contained in the rapid coupling system.

Another preferred embodiment of the invention is that in a first step the pressurised line is coupled with each other which causes a simultaneous axial shifting of the journal on the plug element in the direction of the socket element. The journal shifts the control plunger while forming a stop. In the rapid coupling system a sealing unit in the socket element and a sealing unit in the plug element are released and the medium flows first from a channel in the socket element into a first chamber in the plug element. Simultaneously the cam of the control plunger actuates a pressure relief valve by means of a valve ball thus opening a pressure relief valve system and consequently the pressure relief unit.

Further preferred in a second step following the first one, another sealing unit of the plug element is opened which triggers the coupling pair of the rapid coupling system to open completely. The pressure relief valve system is still open due to the continuous engagement of the cam on the valve ball of the control plunger that is pushed further into the pressure relief valve system, so that a pressure relief continues.

In a third coupling step the journal shifts the control plunger axially and connects the chamber and the channel with each other while simultaneously releasing the valve. The cam of the control plunger keeps the pressure relief valve system open and releases the pressure relief connection to the pressure relief chamber and the adjacent pressure relief line in order to allow a pressure relief within the rapid coupling system.

In the last step the sealing unit opens completely thus causing the cam of the control plunger to withdraw from the pressure relief valve system due to further axial shifting of the coupling elements and the journal while releasing the valve ball and the pressure relief valve, and the pressure relief valve system to close allowing a pressure build-up in the rapid coupling system.

In a preferred embodiment of the invention there can furthermore a control plunger with several cams be provided, so that opening and closing of the rapid coupling system is possible by means of repeated opening and closing of one or several pressure relief valve systems. In this case a pressure relief is possible at different times in the coupling elements of the rapid coupling system.

Further preferred embodiment of the invention result from the other features specified in the sub-claims.

BRIEF DESCRIPTION OF THE DRAWINGS

The invention will be further explained in the following by means of the related drawings. In these.

DETAILED DESCRIPTION OF THE PREFERRED EMBODIMENTS

Figure 1:
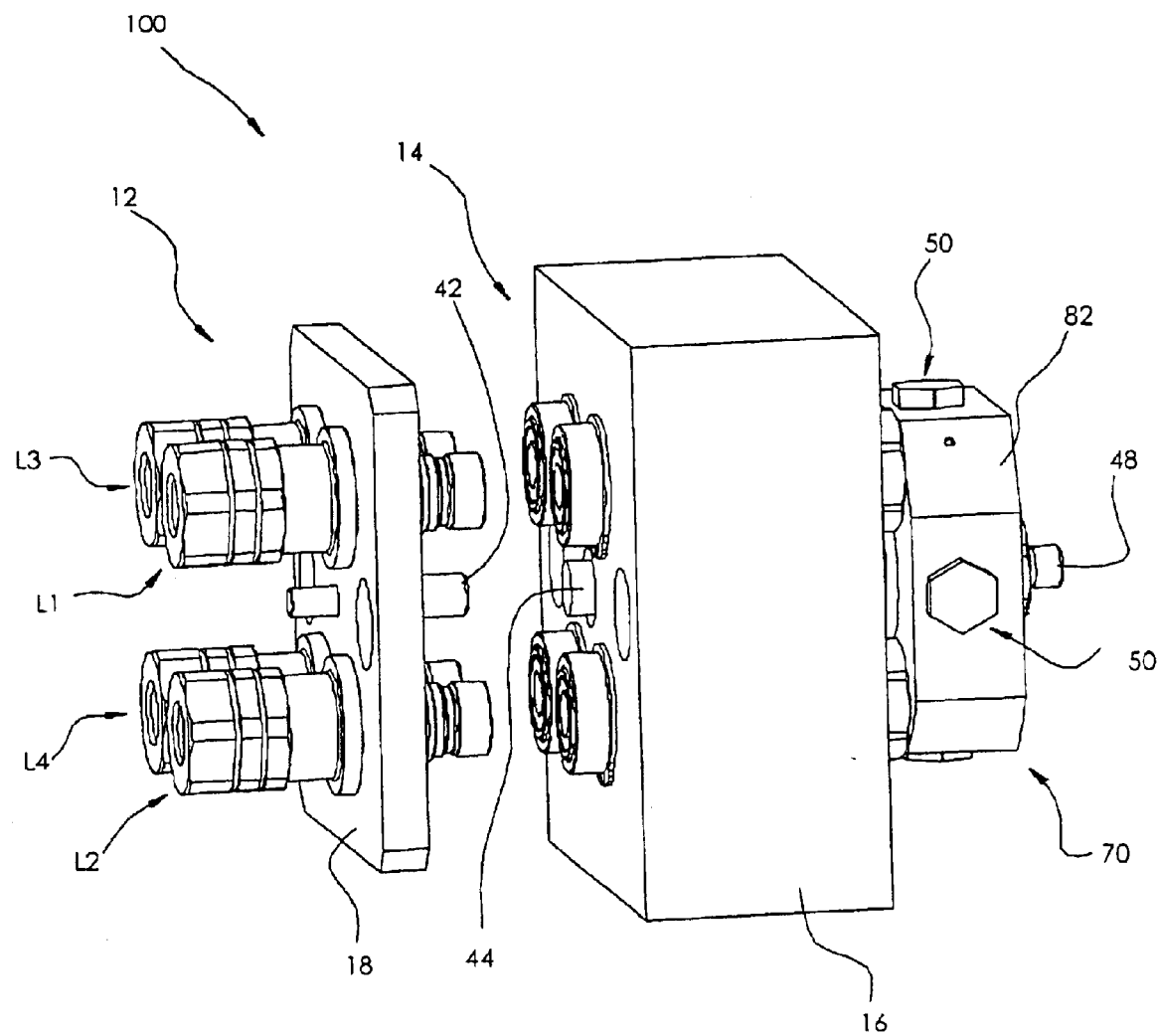
FIG. 1 is an external view of a rapid coupling system in an uncoupled state.

The rapid coupling system as a whole denoted by 100—depicted in FIG. 1 in an uncoupled state—provides a principally known basic construction. It consists of two coupling elements 12 and 14. Wherein the coupling element 12 is a plug element and the coupling element 14 is a socket element. The particularity of the rapid coupling system 100 is that several plug elements 12 of several pressurised lines L1, L2, L3, L4 to be connected with each other are arranged in a connecting block 18. The opposing socket elements 14 of the plug elements 12 are combined in one connecting block 16. The lines L1, L2, L3, L4 extending from the socket elements 14 are not depicted in FIG. 1.

FIG. 1 shows further a journal 42 that is centrically arranged in the connecting block 18 between the lines Lx. Opposing the said journal 42 there is a control plunger 44 between the socket elements 14 that is centrically arranged in the connecting block 16.

The socket elements 14 are furthermore connected with a pressure relief unit 70. The elements of the pressure relief unit 70 are connected with the connecting block 16 through another connecting block 82.

Integrated in the pressure relief unit 70 are the pressure relief valve systems 50. In FIG. 1 only the external connections of the pressure relief valve systems 50 are visible. Each line Lx is allocated a separate pressure relief valve system 50. The existing pressure relief valve systems 50 are connected with a joint pressure relief line 48 by a pressure relief chamber 46 that is not visible in Fig.

Figure 2:
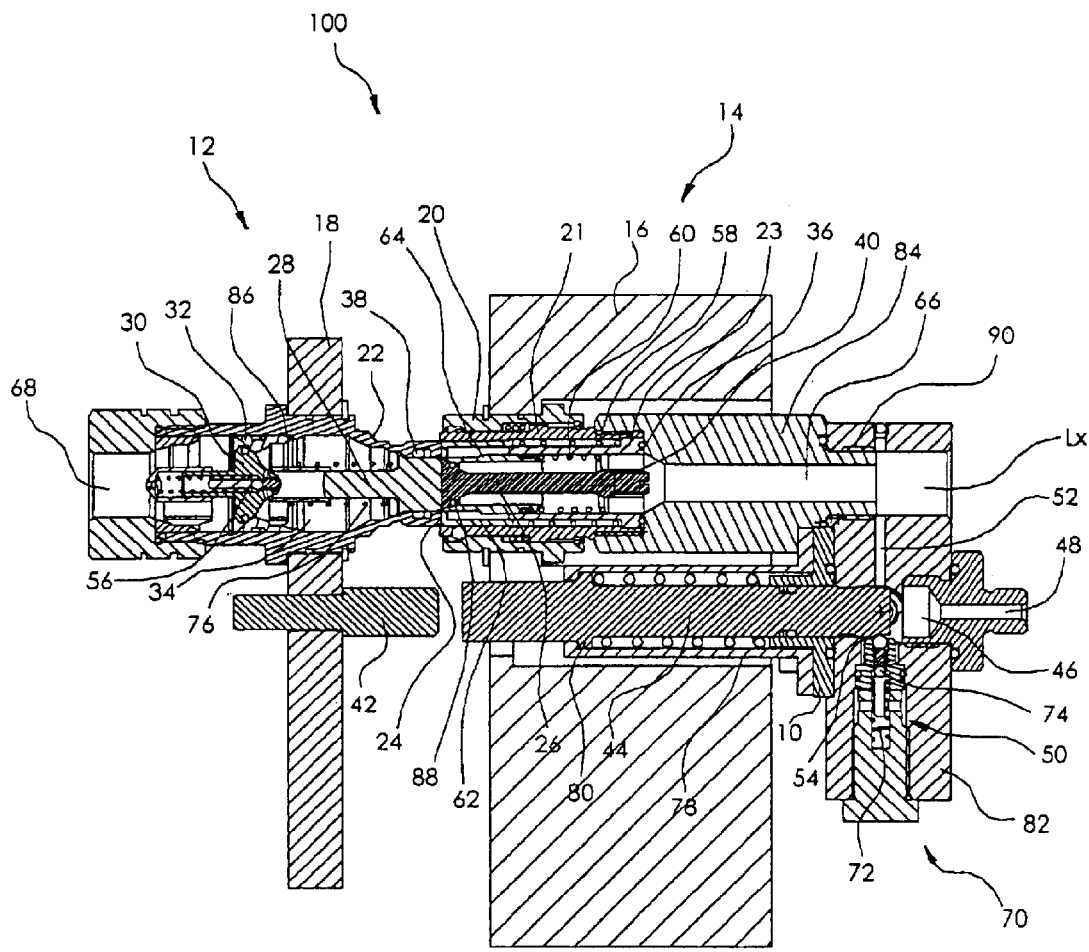
FIG. 2 is a cross-sectional view of the rapid coupling system in an uncoupled state.

FIG. 2 shows a cross-section through a rapid coupling system 100 in the uncoupled state. To facilitate the figure, only one plug element 12 and one socket element 14 of the rapid coupling system 100 for one line Lx are depicted in cross-sectional view. The plug element 12 is connected with a journal 42 through the connecting block 18.

In starting position, the housing face 24 of the housing 22 of plug element 12 is in contact with an axially displaceable housing element 62 of the socket element 14. On the other hand, the face of a tappet 28 which seals by means of a sealing unit 38 on the housing 22 of the plug element 12, is in contact with a fixed mounted sliding element 26.

The sliding element 26 runs in a sliding element bearing 40. The tappet 28 which is axially guided in a tappet bearing 86 is pressed against the sealing unit 38 by the force of a spring element 76 and shuts of a chamber 34 from the atmosphere. The chamber 34 is shut off against a medium-conducting, pressurised channel 68 by a valve 30 on a sealing element 32.

A pressure relief valve 56 can be arranged in the valve 30. The function of the rapid coupling system 100 according to the invention in accordance with the explanations of the other figures, however, is provided also without such pressure relief valve.

The socket element 14 seals an external housing 20 against the connecting block 16. It is mounted non-displaceable in relation of connecting block 16. Next to the exterior housing 20 on the interior surface there is a housing element 21 which forms a stop on a housing block 84 and seals by means of a sealing unit 36 against the housing block 84 of the socket element 14.

The sealing unit 36 of housing element 21 further seals an adjacent housing element 62 located more in the interior against the exterior housing 20.

The housing element 62 is arranged on the interior surface of the housing element 21. Another axially displaceable housing element 64 is arranged at a certain distance to a housing element 23 in the interior of the socket element 14. The housing element 62 is axially displaceable between the housing elements 62 and 64 as well as 21 and 23 working against the force of spring elements 58 and 60. Spring element 58 is arranged between the housing elements 62 and 23 and spring element 60 is arranged between the housing elements 64 and 23. In the uncoupled state, the sliding element 26 seals the socket element 14 against die axially displaceable housing element 64 by means of a sealing unit 88.

Next to the sliding element 26 there is a channel 66 that is open towards the medium-conducting line Lx of the coupling element 14. The channel 66 is integrated in the housing block 84.

On the housing block 84, there is the control plunger 44 integrated in the connecting block 16 by means of a bearing housing 78 and kept at a fixed parallel distance to the rapid coupling system 100.

The control plunger 44 is aligned along the same axis with the journal 42 and forms a stop 80 in the bearing housing 78 in the uncoupled state. The end of the control plunger 44 which does not face the journal is connected by means of a sealing unit with an intermediate bearing 90 and by means of another sealing unit with the pressure relief unit 70. In the uncoupled state, the control plunger 44 does not engage in the pressure relief unit 50 by means of a control unit 10.

The control unit 10 comprises the control plunger 44 and at least one cam 54 that is arranged on the control plunger 44, which in the uncoupled state does not engage in the pressure relief unit 50.

The pressure relief unit 50 comprises a valve spring 72 and a valve ball 74. The valve ball 74 is arranged radially on the control plunger 44.

Extending from the pressure relief chamber 46 there is, on the one hand, at least one pressure relief connection 52 to at least one medium-conducting pressurised line Lx. Such pressure relief connection 52 is closed by the pressure relief valve system 50 in the uncoupled state. On the other hand, the pressure relief chamber 46 is allocated a pressure relief line 48 which is jointly available via the pressure relief valve system 50 to all existing pressure-releasing pressure relief lines 52. All elements of the pressure relief unit 70 are also accommodated in the connecting block 82.

On the basis of the arrangement of the rapid coupling system 100 as specified in FIG. 1 and FIG. 2, a gradual pressure relief of the rapid coupling system 100 can be achieved in the plug element 12 and the socket element 14. In the following it shall be assumed that, in the uncoupled state, both coupling elements 12 and 14 in the channels 66 and 68 are pressurised.

Figure 3:
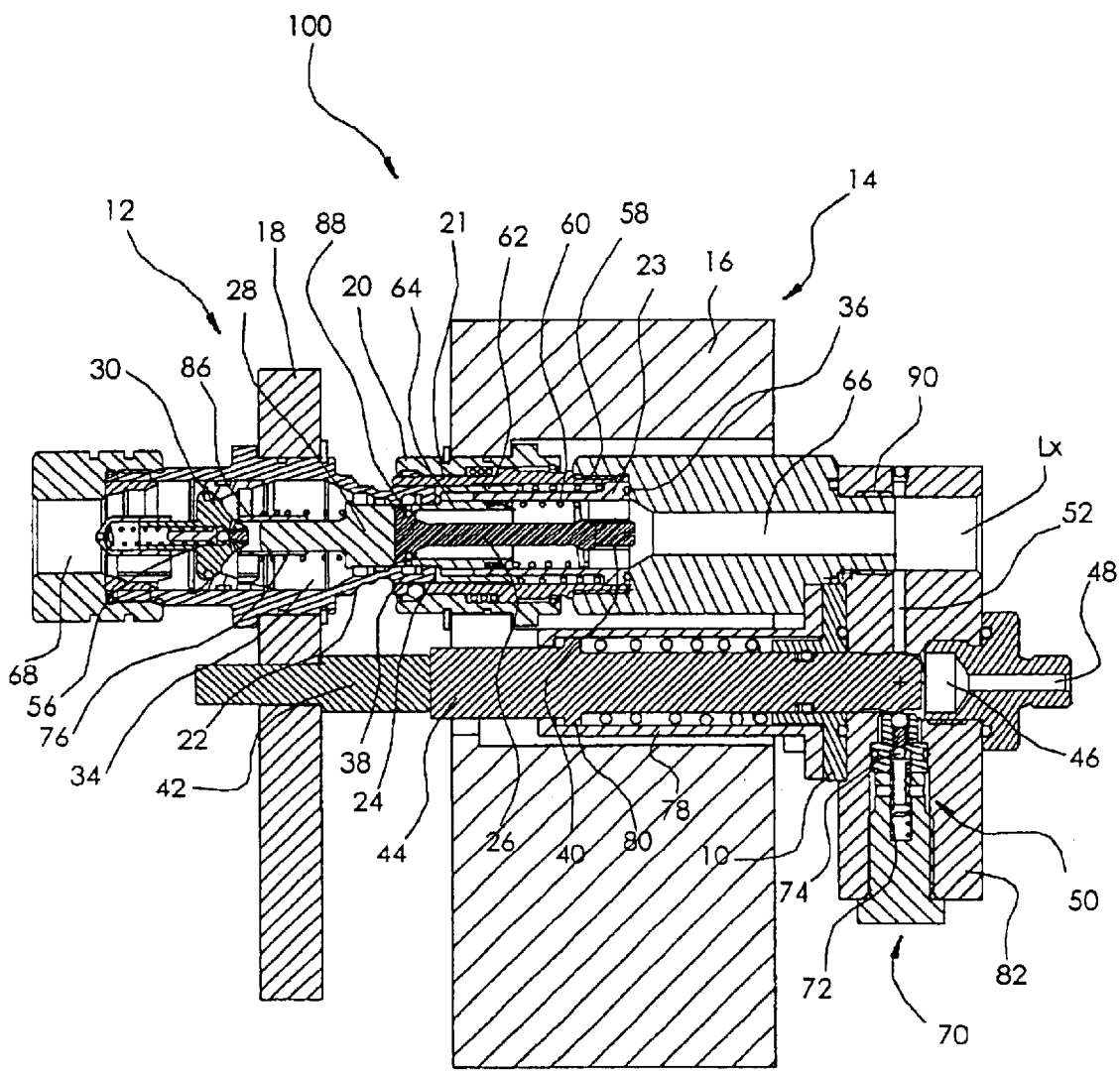
FIG. 3 is a cross-sectional view of the rapid coupling system in a partially coupled state in a first coupling step.

FIG. 3 shows a cross-section through a rapid coupling system 100 in a first coupling step. In this first coupling step the socket element 14 is pressure-releasable during coupling. The function of the pressure relief is specified in detail in the following. To this end only those reference numbers are referred to which are required to explain the action. The other reference numbers correspond to those specified in FIGS. 1 and 2.

The starting position is the uncoupled rapid coupling system 100 as displayed in FIG. 2. By axial displacement of the connecting block 18 with the integrated plug element 12 and the journal 42 in the direction of the socket element 14, the housing end wall 24 of the housing 22 is pushed into the socket element 14.

As a result, the housing elements 62 and 64 are axially displaced in the direction of the channel 66 against the spring elements 58 and 60.

As a result of the opposed force emanating from the stationary sliding element 26, the tappet 28 is displaced axially in the direction of the channel 68 working against the force of the spring element 76.

As a result of this arrangement the sealing unit 88 of the sliding element 26 on housing element 62 is released. At the beginning of the axial displacement the journal 42 gets in contact with the control plunger 44.

The control plunger 44 is pushed deeper into the pressure relief unit 70 than in starting position. The cam 54 engages with the valve ball 74. Against the action of the valve spring 72 the valve ball 74 releases an opening between the pressure relief unit 52 and the pressure relief chamber 46. Due to the pressure relief chamber 46 being connected with a unpressurised pressure relief line 48, a pressure relief occurs in the socket element 14 and partially in the plug element 12 according to the principle of communicating vessels.

The pressure relief action carries on through the pressure relief connection 52 via the channel 66 up to the chamber 34 in the plug element 12. Due to this displacement the control plunger 44 leaves its stop 80 in the bearing housing 78.

Figure 4:
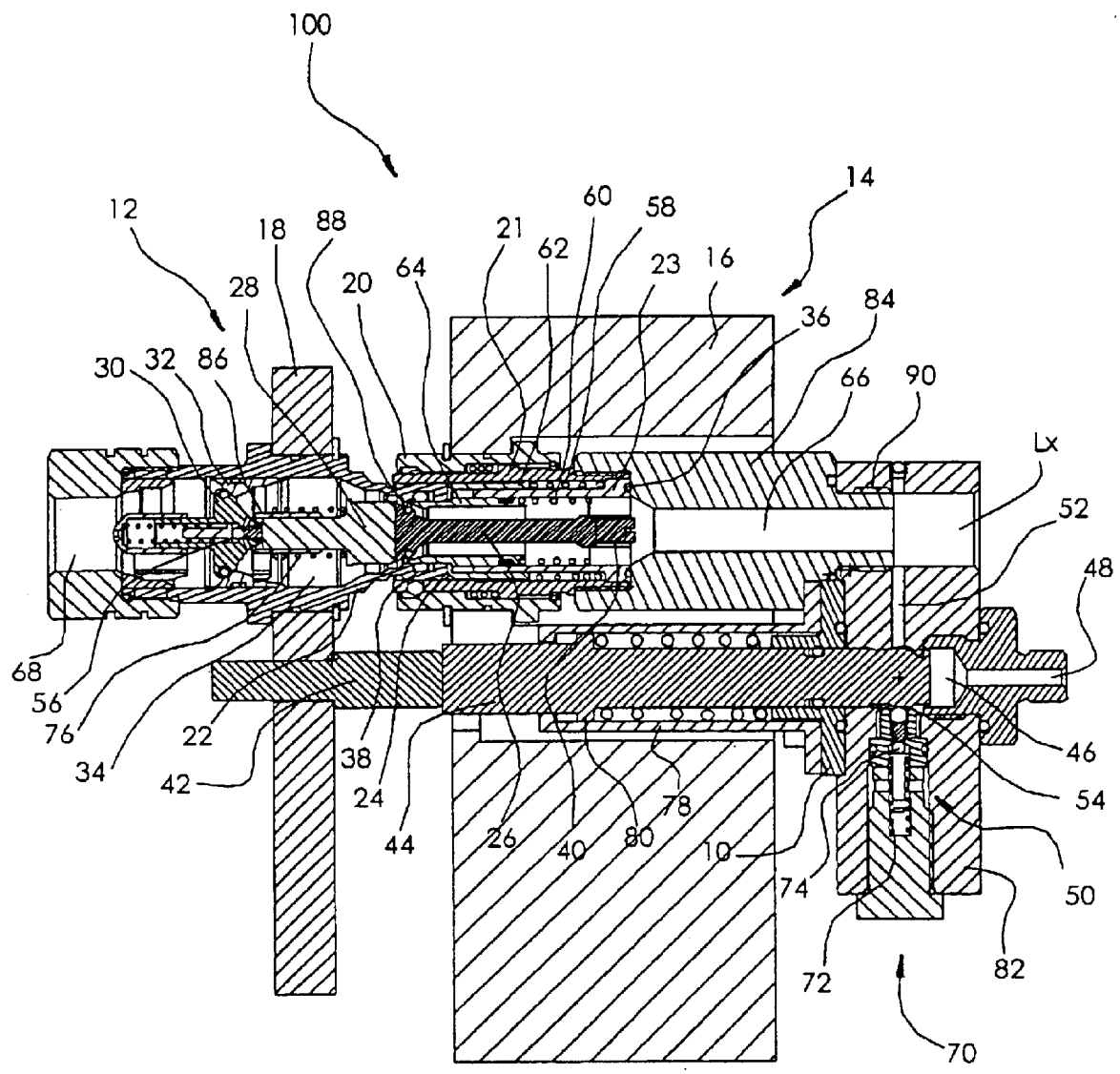
FIG. 4 is a cross-sectional view of the rapid coupling system in a partially coupled state in a second coupling step.

FIG. 4 shows a cross-section through the rapid coupling system 100 in the coupled state after the first coupling step.

It is recognisable that due to the axial displacement of the housing elements 62 and 64 the sealing unit 88 is released and providing a connection to the chamber 34. The spring element 76 of the plug element 12 is already in a state of partial tension. The pressure relief valve system 50 is open and a pressure compensation occurred through channel 66 and the pressure relief connection 52.

In continuation of the movement of the connecting blocks 16 and 18 towards each other the control plunger 44 continues to travel deeper into the pressure relief valve system 50. FIG. 4 shows that the cam 54 is further arranged within the range of the valve ball 74.

A special embodiment which is not essential for the invention, however, enables a first pressure relief by means of a pressure relief valve 56 in one of the two coupling elements 12 or 14. In this embodiment the pressure relief valve 56 is arranged in the plug element 12.

The end of tappet 28 facing the valve 30 engages on a push pin integrated in valve 30, which releases a relay flow in the existing gaps of valve 30. An arrangement like this is known already and serves in this place only to explain and complete the function of the rapid coupling system 100.

During the triggered relay stream leading to a first pressure compensation between the chamber 34 and the channel 68 the valve 30 keeps still resting against the sealing element 32.

During the further coupling process the valve 30 is further displaced axially in the direction of the channel 68 caused by the action of tappet 28. The sealing element 32 is released and the channel 68 is released from pressure by means of the pressure relief unit 70 via chamber 34.

FIG. 4 shows further that the journal continues to displace the control plunger 44 deeper into the pressure relief unit 70 simultaneously. Once the end of the cam 54 is reached the cam starts travelling away from the valve ball 74. Once the cam 54 starts travelling away from the valve ball 74 the pressure relief valve system 50 closes and consequently the pressure relief chamber 46 is closed.

Such pressure relief function according to the FIGS. 3 and 4 can be achieved for any number of coupling pairs 12 and 14 in that several pressure relief valve systems 50 and the related pressure relief connections 52 are arranged radially around the pressure relief chamber 46. Other non-radial arrangements are also conceivable.

Due to the cam 54 being arranged all over the circumference of the control plunger 44, the control unit 10 acts equally pressure-releasing on several coupling pairs 12 and 14 via the pressure relief valve system 50 and the pressure relief connections.

Figure 5:
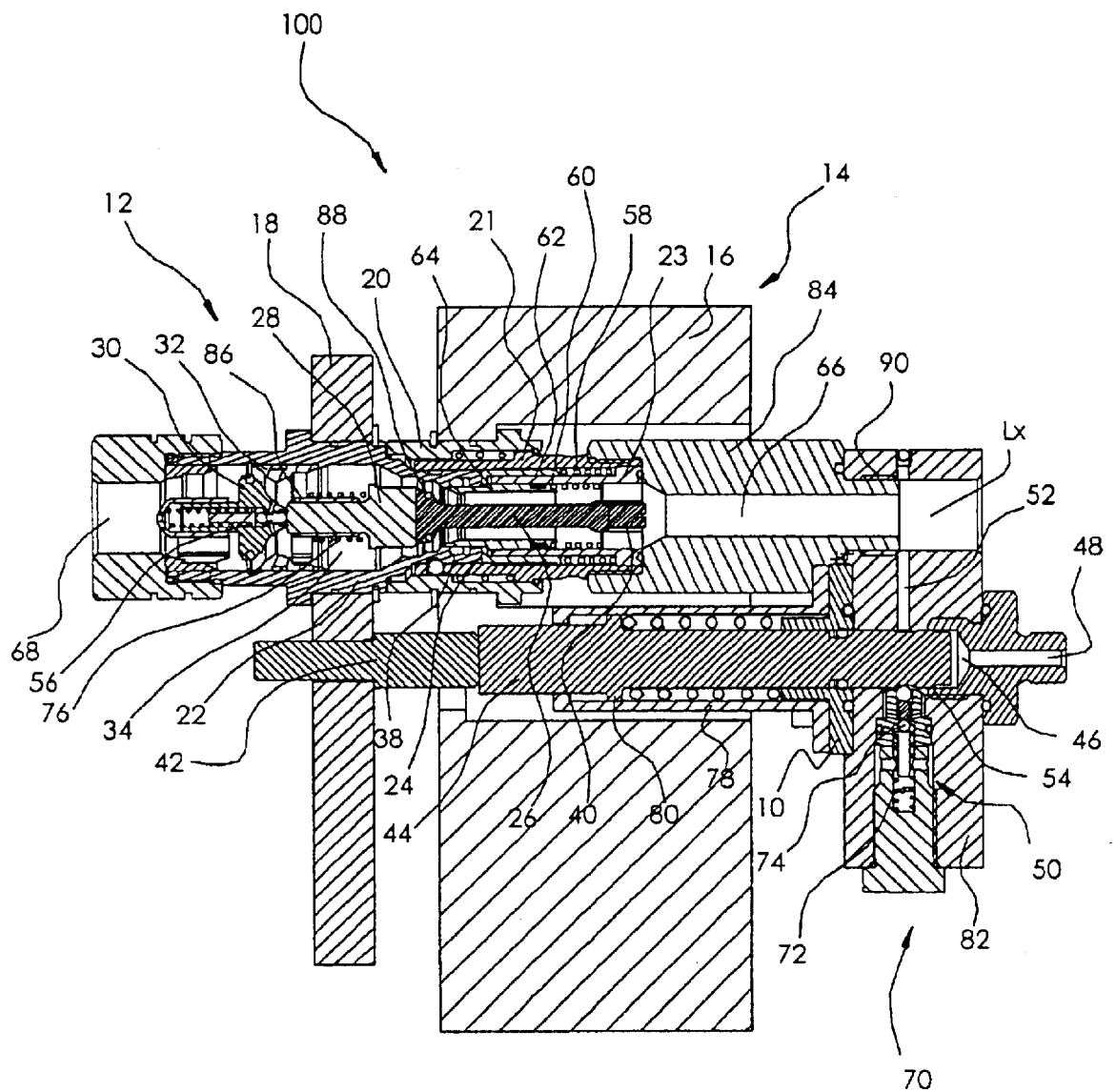
FIG. 5 is a cross-sectional view of the rapid coupling system in a coupled state.

FIG. 5 shows the rapid coupling system 100 in a completely open coupled state.

The spring element 76 is displayed in a state of complete tension. The tappet 28 presses against the valve 30 and the housing 22 of the plug element 12 is displaced completely in the direction of the socket element 14. The housing face 24 has pressed the housing element 62 against the spring elements 58 and 60 so that the sealing unit 88 of the sliding element 26 releases completely the connection between the chamber 34 and the channel 66.

The control plunger 44 is pushed deeper into the pressure relief unit 70 by the journal 42 so that the cam 54 travels away from the valve ball 74 and the effect on the valve body is stopped. The valve ball closes under the effect of the spring 72. As a result, the pressure relief function of the pressure relief unit 70 is discontinued. Inside the rapid coupling system 100 the full media pressure builds up in the associated open coupling elements 12 and 14.

In the last phase of the coupling process of the connecting blocks 18 and 16 the plug element 12 is displaced together with the socket element 14 relative to the exterior non-displaceable housing 20 of the socket element 14 inside the connecting block 16. The plug element 12 as a whole and the socket element 14 guided by the housing element 21 are displaced together with the housing block 84 in the exterior housing 20. Because of the connection between the housing block 84 and the bearing housing 78 by means of the intermediate bearing 90 the connecting block 82 as a whole is displaced by the same distance together with the integrated pressure relief unit 70. The rapid coupling system 100 has now reached its coupled end position.

Figure 6:
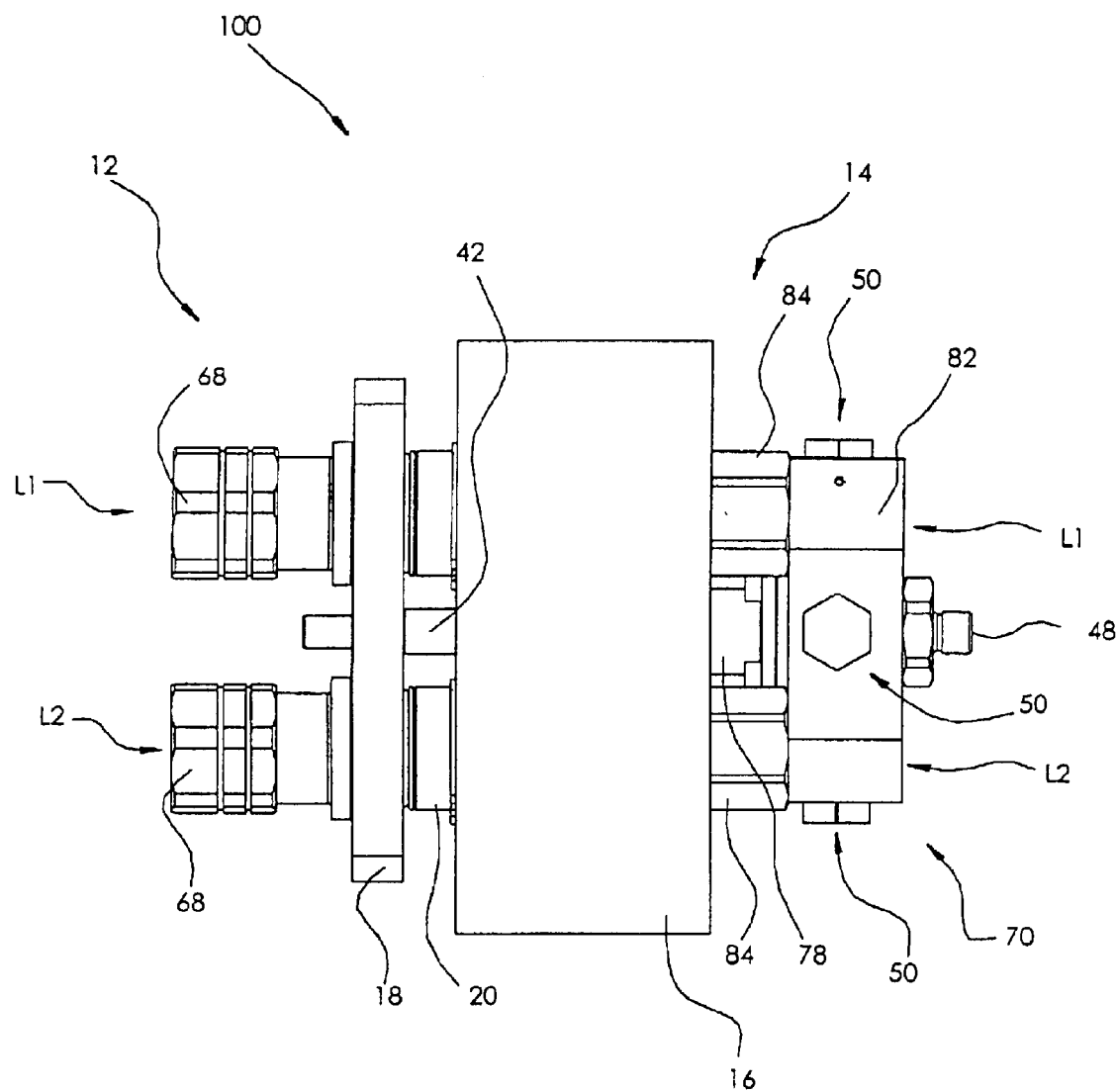
FIG. 6 is an external view of a rapid coupling system in a coupled state.

FIG. 6 shows an external view of the rapid coupling system 100 in a coupled state. Visible are the coupled lines L1 and L2 between the connecting blocks 16 and 18 and the connecting block 82 which accommodates the pressure relief unit 70. The lines L3 and L4 are located invisibly behind the lines L1 and L2.

The pressure relief unit 70 is conducted by means of the pressure relief chamber 46 which is invisible from outside towards the common pressure relief line 48. Just implied by their locking elements are the pressure relief valve systems 50 which are arranged radially to the control plunger 44 and which are opened and closed during the coupling process by means of the journal 42 and the control plunger 44. Further the exterior housing 20 of the plug element 12 is visible. The housing block 84 between the connecting blocks 16 and 82 makes FIG. 6 complete.

The rapid coupling system 100 is opened the other way round.

In accordance with the coupling steps specified in FIGS. 4 and 3, first the chamber 34 opposite of channel 68 is closed by means of the valve 30 under pressure relief caused by pressure relief unit 70.

The force of the spring element 76 causes the tappet 28 to return to its starting position. The housing elements 62 and 64 are also displaced back to their starting positions caused by the force of the spring elements 58 and 60 so that the sealing unit 88 of the sliding element 26 rests sealing again on the housing element 64.

This seals the channel 66 in the socket element 14 under pressure relief against the chamber 34 or tappet 28 respectively.

Simultaneously the pressure relief unit 70 closes in that the control unit 10 leaves the area of the valve ball 74 in the pressure relief unit 70, and pressure relief is discontinued. So subsequent to the separation of the connecting blocks 16 and 18, each of the coupling elements 12 and 14 for itself is sealed against the pressure relief unit 52 as well as on its face wall.

LIST OF REFERENCE NUMERALS 100 rapid coupling system
10 control unit
12 plug element
14 socket element
16 connecting block
18 connecting block
20 exterior housing
21 housing element
22 housing
23 housing element
24 housing face
26 sliding element
28 tappet
30 valve
32 sealing element
34 chamber
36 sealing unit
38 sealing unit
40 sliding element bearing
42 operating mechanism (journal)
44 control plunger
46 pressure relief chamber
48 pressure relief line
50 pressure relief valve system
52 pressure relief connection
54 cam
56 pressure relief valve
58 spring element
60 spring element
62 housing element
64 housing element
66 channel
68 channel
70 pressure relief unit
72 valve spring
74 valve ball
76 spring element
78 bearing housing
80 stop
82 connecting block
84 housing block
86 tappet bearing
88 sealing unit
90 intermediate bearing
91 sealing unit
Lx lines

What is claimed is:

1. A rapid coupling system for establishing a pressure sealed connection of at least two pressurized lines, comprising:

a first coupling element connectable to the at least two pressurized lines and comprising a plug element having an operating mechanism in a connecting block thereof;

a second coupling element adapted to be connected to the first coupling element in a pressure sealed manner, the second coupling element comprising a socket element having a connecting block, and a control unit arranged in the socket element connecting block and comprising a displaceable plunger having at least one cam; and a pressure relief unit connectable to at least one of the pressurized lines via at least one pressure relief connection;

whereby upon connecting the first and second coupling elements, the operating mechanism displaces the control plunger, causing at least one cam of the control plunger to engage the pressure relief unit.

2. The rapid coupling system of claim 1, wherein the operating mechanism comprises a journal with which the control plunger cooperates and which is particularly arranged on the same axis with the control plunger.

3. The rapid coupling system of claim 2, wherein the pressure relief unit comprises the control unit, the pressure relief connection, at least one pressure relief valve system, at least one pressure relief chamber and at least one pressure relief line.

4. The rapid coupling system of claim 3, wherein the at least one pressure relief valve system comprises at least one valve spring and at least one valve ball.

5. The rapid coupling system of claim 3, wherein each pressure relief connection is allocated at least one pressure relief valve system.

6. The rapid coupling system of claim 3, wherein several pressure relief valve systems of the pressure relief unit are conducted towards at least one pressure relief chamber and at least one pressure relief line.

7. The rapid coupling system of claim 3, wherein the pressure relief valve system is arranged radially to the control plunger.

8. The rapid coupling system of claim 3, wherein the control unit and the pressure relief chamber with its pressure relief line are arranged on the same axis.

9. The rapid coupling system of claim 1, wherein the first coupling plug element comprises a valve between a channel and a chamber and a sealing unit between a tappet and a housing.

10. The rapid coupling system of claim 1, wherein the second coupling socket element comprises a sealing unit between a sliding element and a housing element.

11. The rapid coupling system of claim 1, wherein during a coupling process of the first and second coupling elements the respective connecting blocks thereof are simultaneously displaceable against each other.

12. The rapid coupling system of claim 6, wherein the journal that operates the control plunger opens a passage from a channel in the socket element in a first coupling step, wherein by means of the cam of the control plunger the pressure relief valve towards a pressure relief chamber is opened.

13. The rapid coupling system of claim 12, wherein a valve comprises in a second coupling step a connection between the channel and the pressure relief chamber through the pressure relief valve, via the chamber, passing by the sealing unit through the channel, via the pressure relief connection through the pressure relief valve system, wherein by means of the cam of the control plunger the pressure relief valve system towards the pressure relief chamber and the adjacent pressure relief line is kept open to enable a pressure compensation inside the rapid coupling system.

14. The rapid coupling system of claim 13, wherein the journal displaces the control plunger axially in a third coupling step thus connecting the chamber and the channel with each other while simultaneously releasing the valve, while the cam of the control plunger keeps open the pressure relief valve system and releases the pressure relief connection towards the pressure relief chamber and the adjacent pressure relief line to enable a pressure compensation inside the rapid coupling system.

15. The rapid coupling system of claim 14, wherein in a fourth coupling step due to a further axial displacement of the journal the control plunger is pushed completely into the pressure relief valve system, wherein the cam of the control plunger is passing by the pressure relief valve system and the pressure relief connection towards the pressure relief chamber and the adjacent pressure relief line in the rapid coupling system is closed.

16. The rapid coupling system of claim 15, wherein the cam releases a valve ball thus causing the pressure relief valve system subject to the action of a valve spring to travel to its closing position.

17. A rapid coupling system according to claim 13, wherein in the second coupling step the pressure relief valve can be opened in that a tappet actuates a push pin pushing it into the valve.

* * * * *